O. L. OLSON.
CHECK ROW POTATO PLANTER.
APPLICATION FILED JULY 3, 1916.

1,203,393.

Patented Oct. 31, 1916.
2 SHEETS—SHEET 1.

INVENTOR:
Oscar L. Olson
BY his ATTORNEY:
A. M. Carlsen

O. L. OLSON.
CHECK ROW POTATO PLANTER.
APPLICATION FILED JULY 3, 1916.
1,203,393.
Patented Oct. 31, 1916.
2 SHEETS—SHEET 2.
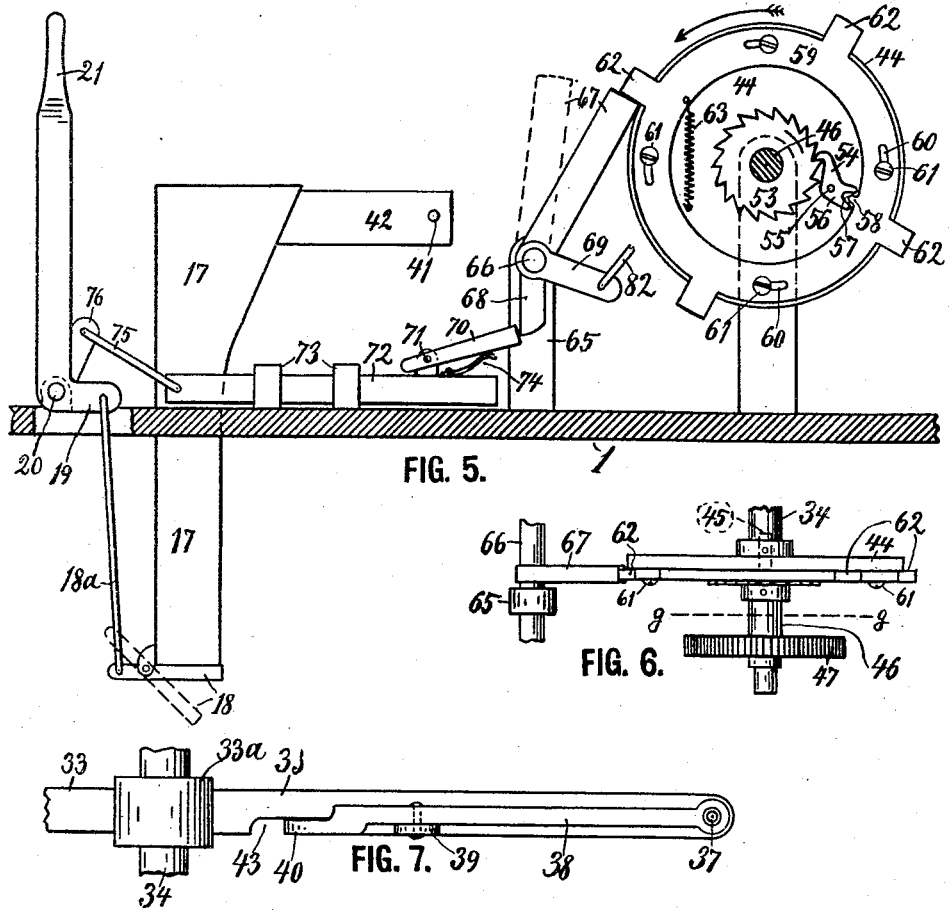
INVENTOR:
Oscar L. Olson.
BY his ATTORNEY:
A. M. Carlsen.

UNITED STATES PATENT OFFICE.

OSCAR L. OLSON, OF ST. PAUL, MINNESOTA.

CHECK-ROW POTATO-PLANTER.

1,203,393.  Specification of Letters Patent.  Patented Oct. 31, 1916.

Application filed July 3, 1916. Serial No. 107,222.

*To all whom it may concern:*

Be it known that I, OSCAR L. OLSON, a citizen of the United States, residing at St. Paul, in the county of Ramsey and State of Minnesota, have invented a new and useful Check-Row Potato-Planter, of which the following is a specification.

This invention relates to wheel supported machines for planting potatoes, and the main object is to provide a check rower potato-planter which will plant potatoes at desired distances apart in spaced rows without missing any hill and without planting more than one potato in each hill.

Figure 1:
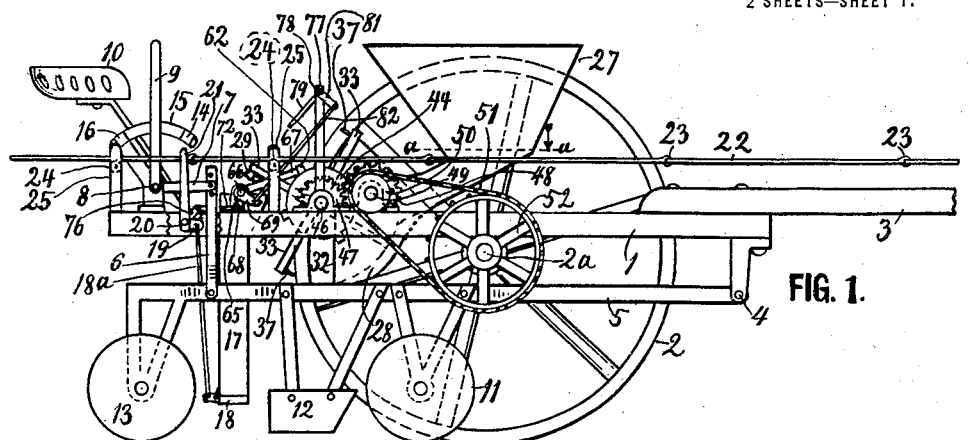
Figure 2:
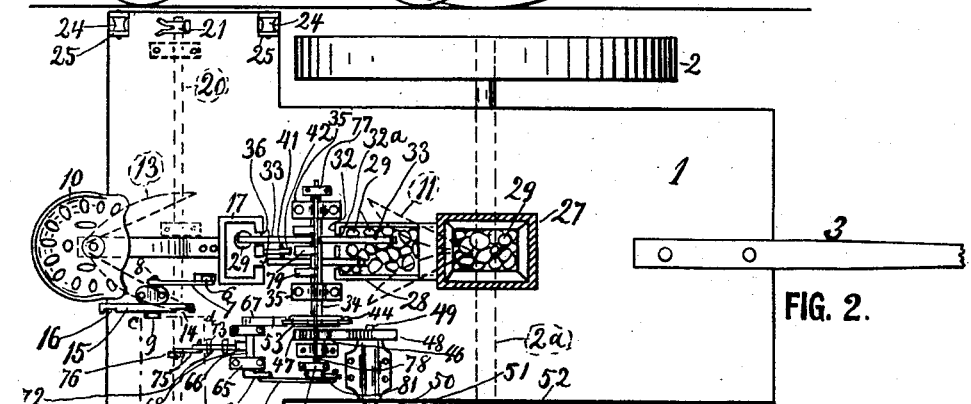
Figures 3, 4:
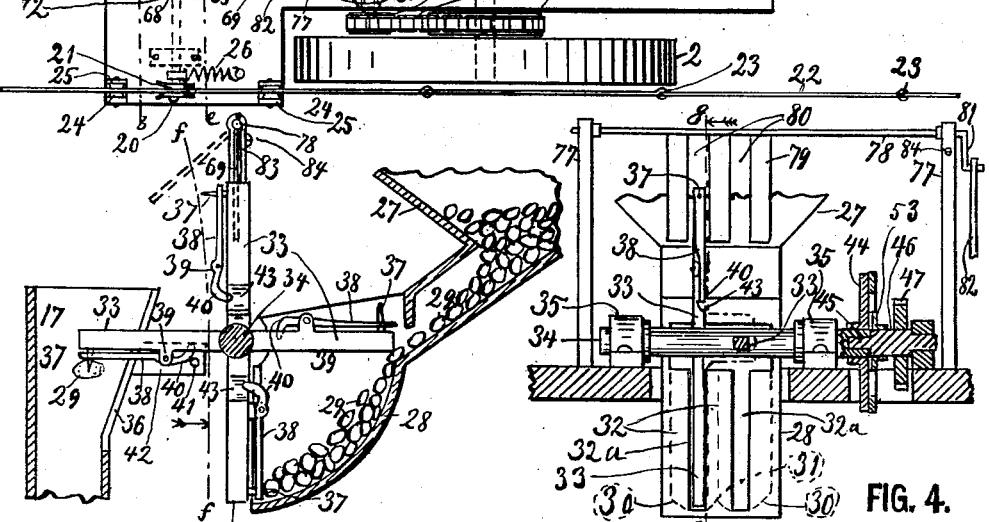

In the accompanying drawings,—Figure 1 is a side elevation of the improved potato planter with one of its ground wheels removed and the portion of the frame bounded by the line $a$—$b$—$c$—$d$—$e$ in Fig. 2 broken away; owing to limited space of the drawing some parts are imperfectly shown but will be found more clearly shown in other views. Fig. 2 is a top or plan view of Fig. 1 with the hopper intersected on the line $a$—$a$ in Fig. 1. Fig. 3 is a partly sectional view of an enlarged portion of Fig. 1 about as on the line $g$—$g$ in Fig. 4. Said Fig. 4 is a cross section of the machine about as on the line $f$—$f$ in Fig. 3. Fig. 5 is an enlarged partly sectional view showing more clearly the clutch mechanism and its relation to the dropping tube and check rower fork; in this view the shaft 34 is intersected on the line $g$—$g$ Fig. 6. Fig. 6 is a top view of the portion of Fig. 5 above it with the gear 47 added. Fig. 7 is a detail face view of one of the potato carrying arms and the hub and shaft carrying it.

Referring to the drawing by reference numerals, 1 designates the body or main frame of the machine, which is supported by a pair of side wheels 2 and provided with a draft pole 3 to which horses or other motive power may be attached. Pivoted with its forward end at 4 is a substantially central longitudinal bar 5, whose rear portion is connected by a link 6 to a rocker arm 7 of a short rock-shaft 8, which is mounted on the frame and provided with a hand lever 9 near the operator's seat 10. From said bar 5 depends a pair of furrow opening disks 11, and rearward thereof a V-shaped furrow opener 12 (shown in Fig. 1) and still farther back a pair of furrow closing disks 13. Said furrow opening and closing devices are lowered into the ground by moving the hand lever 9 into the notch 14 of a fixed sector 15, and by bringing the lever into the rear notch 16 of the sector the furrow working devices are raised high enough above the ground to permit the machine to be driven idle over the field.

Suspended from the main frame and extending also partly above the same, is a potato dropping tube 17, having its lower end arranged in rear of the furrow opener 12 and provided with a pivoted valve 18 operated by a rod 18$^a$ and a rocker arm 19, (see Fig. 5) the latter being fixed on a rock shaft 20 which is journaled across the frame and provided with two forks 21, one near each side of the machine, said forks being adapted for operation by a check line 22 having obstructions 23 engaging the fork at one side of the machine to tilt it when the machine is driven in one direction over a potato field, and to operate the other fork when the machine is driven in the reverse direction. The check line is supported on rollers 24 in posts 25, where it is kept by a cover (not shown) to prevent its accidental escape upward. Every time the forks 21 have been swung rearwardly by an obstruction on the check line, a spring 26 (see Fig. 2) restores them to normal position, thereby closing the valve 18 after a potato has been deposited in the furrow.

The potato carrying mechanism consists of a hopper or magazine 27 having a segmental downward extension 28, into which the potatoes 29 are gradually moved by their own weight. The bottom of said extension presents two parallel curved segmental grooves 30 (see Fig. 4) with an intermediate ridge 31. The rear end wall 32 of said extension is formed with two deep notches or slits 32$^a$, inward through which move four radial arms 33, which are fixed on a shaft 34 rotated in bearings 35. The arms 33 are arranged in pairs operating one pair in each notch 32$^a$ and swinging into similar notches 36 in the dropping tube 17; each pair has its two members extended in diametrically opposite directions and provided with a sharp prong 37 by which to impale and carry one potato at a time from the hopper extension into the dropping tube. When the potato is in a position to be dropped into the tube 17 it is pushed off from the prong 37 by a stripper lever 38, which is pivoted to a lug 39 of the arm and has its inner and curved end 40 so arranged that it passes into contact with a stud 41 fixed in a flat bracket 42, secured on the dropping tube; each side of the bracket is provided with such stud, one stud serving to actuate each pair of stripping levers. 43 are clearings in the arms 33 for the cam-shaped parts 40 of the stripping levers. It is of course understood that when each stripping lever has stripped the potato from the prong it passes by the stud 41 and is free to be depressed against the arm by the next potato into which the prong is forced.

The arms 33 may be fixed in a hub like 33ª in Fig. 7, and may then be termed a spider fixed on a spider shaft 34. Said shaft is provided with a disk-like clutch member 44, (best shown in Figs. 5, 6 and 4) and has one end formed with a cavity in which is journaled the end 45 of an abutting short shaft 46, on which is fixed a gear 47, driven by a gear 48, which is fixed on a countershaft 49 having a sprocket 50 driven by a chain 51 and a sprocket 52, the latter being fixed either to one of the ground wheels 2 or to the axle 2ª thereof if the latter is made rotatable in its bearings.

On the short shaft 46 is fixed a ratchet wheel 53 (best shown in Fig. 5) which acts as a second clutch-member by engaging a dog 54 pivoted at 55 to the clutch member 44. Said dog is provided with a tail 56, having a notch 57 in which engages a tooth 58 of a ring 59, which has a slight rotary movement about its center, it having slots 60 loosely engaged by headed studs 61 secured in the member 44. Said ring is provided with four radial fingers 62. A spring 63 serves to hold the ring normally in position shown so that the dog 54 engages the ratchet wheel.

Journaled in bearings 65 is a short rock shaft 66 having three radial arms 67, 68, 69. The arm 68 receives motion from the end of a push piece 70 which is pivoted at 71 to a bar 72 sliding in bearings 73 and having a spring 74 raising the push piece 70 into engagement with and allowing it to be retracted below the arm 68. Said slide 72 is connected by a link 75 to a rocker arm 76 on the fork shaft 20, so that each time the forks 21 are swung forward by the spring 26 the push piece 70 causes the arm 67 to swing beyond the ends of the fingers 62, whereupon the spring 63 rotates the ring 59, and as the dog is thereby engaged in the ratchet wheel, the latter, which is constantly rotated as long as the machine is in motion, rotates the clutch member 44 and thereby the spider 33 until one potato has been carried into the dropping tube 17, when the spider shaft is uncoupled by the following mechanism: Mounted in posts 77 is a light rock shaft 78 having a depending wing 79 with two slots 80 in it (see Fig. 4) and at one end of the shaft is a rocker arm 81 connected by a link rod 82 to the arm 69 on shaft 66 (see Figs. 5, 1 and 2).

In Fig. 3 it will be seen that the shaft 78 is friction held against accidental rotation by having the upper part of one of its bearing posts split at 83 and provided with a clamping screw 84 arranged to draw the split portion against the shaft with any desired tension.

The operation of the above last described mechanism is as follows: Supposing the potatoes are to be planted three feet apart, then while the machine is driven forward three feet the spider makes about one revolution and would thus bring four potatoes into the dropping tube, but as it is desired to have only one potato in the tube when its valve is opened, only one of the spider arms is allowed to carry a potato into the tube during the three feet run of the machine, the other three spiders are only for reserve in case one or more arms should miss the potato in the hopper extension, for any arm missing the potatoes will pass idle through the apron 79, but the first arm bringing a potato can not pass through the apron without swinging it by the potato and thus operate the rod 82 and cause the arm 67 to uncouple the spider shaft, leaving the ratchet wheel 53 to run idle until the arm 67 is disengaged again from finger 62 by the means already described, so that the spring 63 can act on the ring 59 and cause dog 54 to engage the ratchet wheel again.

What I claim is:—

1. In a potato planter, the combination with a pair of ground wheels, of a frame carried thereby and having a draft pole, furrow opening means and furrow closing means carried by the same, means for adjusting said furrow working devices into and upward above the ground a potato dropping tube carried by the frame and having in its lower end a valve, a potato magazine having an upwardly open extension with slits in the wall nearest the dropping tube, a spider mounted to rotate near said slits and having arms swinging through the slits and provided each with a sharp prong by which to engage a potato and carry it into the dropping tube, means for automatically disengaging each potato from the arm into the tube, operative connection between said spider and one or both of the ground wheels, to rotate the spider normally at a superfluous speed, a coupling device inserted in the operative connection, a trigger controlling the coupling mechanism and arranged to be operated by each potato passing to the dropping tube, so as to prevent more than one potato from being dropped at one time by the tube, a check rower mechanism arranged to operate the valve, a spring restoring the check rower mechanism to normal position after each potato is dropped, operative connection between said spring and the valve and the trigger to restore them automatically to normal position after each potato is dropped into the furrow.

2. In a potato planter, a dropping tube designed to drop one potato at a time into the ground, a valve controlling the lower end of said tube, means for opening the valve automatically at certain predetermined spaced points in the travel of the planter, a wheel carrying potatoes one by one from a supply toward the tube faster than the tube is supposed to drop them, means for driving said wheel, and automatic means for uncoupling it by each potato actually carried into the tube, and automatic means for coupling the wheel again to its driving means as soon as the dropping tube is emptied.

In testimony whereof I affix my signature.

OSCAR L. OLSON.

Copies of this patent may be obtained for five cents each, by addressing the "Commissioner of Patents, Washington, D. C."